United States Patent [19]

Hoffman et al.

[11] Patent Number: 5,601,761
[45] Date of Patent: Feb. 11, 1997

[54] ENCAPSULATED ACTIVE MATERIALS AND METHOD FOR PREPARING SAME

[75] Inventors: Dwight K. Hoffman, Midland; David V. Dellar, Beaverton, both of Mich.; Herman W. Schlameus, San Antonio, Tex.

[73] Assignee: The Dow Chemical Company, Midland, Mich.

[21] Appl. No.: 311,818

[22] Filed: Sep. 26, 1994

[51] Int. Cl.$^6$ .......................... B01J 13/02; B01J 13/20; B01J 13/22

[52] U.S. Cl. .......................... 264/4.3; 264/4.4; 264/4.6; 264/4.7

[58] Field of Search .......................... 264/4.3, 4.4, 4.6, 264/4.7

[56] References Cited

U.S. PATENT DOCUMENTS

| | | | |
|---|---|---|---|
| 3,015,128 | 1/1962 | Somerville | 264/4.3 |
| 3,310,612 | 3/1967 | Somerville | 264/4.3 |
| 4,675,140 | 6/1987 | Sparks et al. | 264/4.3 |
| 4,764,317 | 8/1988 | Anderson et al. | 264/4.3 |

FOREIGN PATENT DOCUMENTS 1112962  5/1989  Japan.

OTHER PUBLICATIONS

"Scale–up Problems Associated with Microencapsulated Systems" by William W.Harlowe Jr. Presentation at The Arden House Conference, Feb. 13–18 1983.

"A New Method for Coating Glass Beads for Use in Gas Chromatography of Chloropromazine and Its Metabolites" by Donald E. Johnson et al.–listed in Journal of G. C. Oct. 1965 pp. 345–347.

*Primary Examiner*—Nathan M. Nutter

[57] ABSTRACT

An active material encapsulated in a coating material immiscible therewith is contacted with a solvent that dissolves residual active material on the surface of the coating material without dissolving the coating material. The resultant encapsulated material has improved stability as compared to the material not contacted with solvent.

16 Claims, No Drawings

ENCAPSULATED ACTIVE MATERIALS AND METHOD FOR PREPARING SAME

STATEMENT OF GOVERNMENT INTEREST

This invention was made with support of the United States Government under Subcontract No. 08945 awarded by Southwest Research Institute (under Prime Contrat No. N62269-91-C-0250). The Government has certain rights to this invention.

BACKGROUND OF THE INVENTION

This invention relates to a method of encapsulating an active material in a protective coating material immiscible therewith, and the encapsulated active material of this method.

Coating or microencapsulation of active materials is commonly done to protect these materials from the environment, or to control their release or improve their handling. Many coating or microencapsulating techniques have been described in the art. For example, Somerville (U.S. Pat. No. 3,015,128, incorporated herein by reference) describes a centrifugal encapsulating apparatus that produces mass quantities of relatively small individual capsules of solid or liquid active material which may have substantially uniform and predetermined characteristics. In a later patent (U.S. Pat. No. 3,310,612, incorporated herein by reference), Somerville describes a method and apparatus for centrifugally forming high quality capsules having a diameter as large as 1500 microns.

Johnson et al. (*J. of Gas Chromatography*, 345, (1965), incorporated herein by reference) describes a method for coating glass beads with a mixture of liquid phases and particles of diatomaceous earth which is reproducible and improves column efficiency.

Harlowe ("Scale-Up Problems Associated with Microencapsulated Systems" The Arden House Conference, pp 1–2, Feb. 13–18, 1983, incorporated herein by reference) describes both a submerged nozzle device, which can be used to produce capsules between 1200 and 2500 microns, and a centrifugal extrusion apparatus, which can produce capsules in the 500- to 1000-micron range.

Anderson et al. (U.S. Pat. No. 4,764,317, incorporated herein by reference) addresses the problem of capsule breakage, due in large measure to collision of capsules, by providing a continuous collection system for microcapsules with a liquid fill which protects the capsules and reduces capsule breakage.

Sparks et al. (U.S. Pat. No. 4,675,140, incorporated herein by reference) describes a method and apparatus for coating or microencapsulating both solid particles and viscous liquid droplets which enables at least a majority of the particles to be coated individually or discretely rather than in clusters while simultaneously providing improved means for separating unwanted and unused liquid coating material from the coated particles. The process is controlled to produce a predominance of droplets of excess liquid coating material of a predetermined size which are smaller than the coated individual mass components.

Uratsuka (Japan Public Patent Disclosure Bulletin No. 2-292324) describes a microcapsule-type urea-type hardening accelerator enclosed within a thermoplastic resin with a softening point of 40° C. to 200° C.

Coated spheres or microcapsules formed by processes such as those referred to above can suffer from the presence of active material on the surface of the coating material, thereby negating the advantages sought by coating or microencapsulation.

It is therefore an object of this invention to form coated spheres of active material, the outer surface of which spheres are free of active material.

SUMMARY OF THE INVENTION

The present invention is a method of encapsulating an active material in a coating material immiscible therewith, the coating material having a melting point above ambient temperature, the method comprising the steps of:
  a) dispersing the active material in the coating material at a temperature sufficient to melt the coating material;
  b) forming droplets of active material interspersed with the coating material;
  c) cooling the droplets to solidify the coating material; and
  d) contacting the droplets with a solvent that dissolves the active material but does not dissolve the coating material, so as to remove active material from the surface of the coating material.

A further aspect of the present invention is a microsphere comprising an active material microencapsulated within a coating material, the surface of which coating material is solvent-contacted free of active material with a solvent for the active material.

The present invention addresses a problem in the art of coating or microencapsulation by removing residual active material from the surface of the coating material.

DETAILED DESCRIPTION OF INVENTION

The method of the present invention requires four steps: a) dispersing the active material in the coating material at a temperature sufficient to melt the coating material; b) forming droplets of active material interspersed with the coating material; c) cooling the droplets to solidify the coating material; and d) contacting the droplets with a solvent that dissolves the active material but does not dissolve the coating material, so as to remove active material from the surface of the coating material. The following is a detailed description of each of the four steps.

In a first step of the method of encapsulating an active material in a coating material, a heterogeneous mixture of the active material and a coating material is formed at temperatures sufficiently above ambient temperature to melt the coating material without decomposing or volatilizing either the coating material or the active material. The active material and coating material are selected to be insoluble (or immiscible) with each other.

The coating material preferably has a melting point in the range of about 40° C. to about 200° C. The coating material is more preferably a petroleum-derived alkane hydrocarbon wax, a polyethylene wax, a polyethylene-alkene copolymer, an oxidized hydrocarbon wax containing hydroxyl or carboxyl groups, a polyester, a polyamide, or a combination thereof. Most preferably, the coating material is a petroleum-derived alkane hydrocarbon wax, a polyethylene-alkene copolymer, or a polyethylene wax. Most preferably, the coating material is a polyethylene wax. Preferred polyethylene waxes preferably have a weight average molecular weight in the range of about 500, more preferably from about 1000, to about 3000, more preferably about 2000 Daltons. These waxes are exemplified by Polywax™ 500, Polywax™ 1000, and Polywax™ 2000, or blends thereof, more preferably a 75:25 blend of Polywax™ 1000 and Polywax™ 2000. (Polywax is a trademark of Petrolite Corporation.)

The active material may either be a liquid or a solid at room temperature, but it is preferably a solid at room temperature. More preferably, the active material has a melting point above ambient temperature, but below a temperature of decomposition or volatilization of the coating material. Thus, the melting point of the active material may be greater than, less than, or equal to the melting point of the coating material. In any case, it is preferred in the first step of the method, that the active material is dispersed in the coating material at a temperature above the melting point of both the coating material and the active material without decomposing either the coating material or the active material.

The active material may be any material that forms a heterogeneous slurry with the coating material and that dissolves in a solvent that does not dissolve the coating material. For example, the active material may be a drug used for sustained-release applications, an insecticide, a herbicide, a flavoring compound, a dye, a catalyst, or a curative.

The active material is preferably a curative, more preferably a hardening accelerator having a melting point or a glass transition temperature ($T_g$) from about 70° C. to about 200° C.

The hardening accelerator is preferably a urea or an imidazole. Preferred ureas include 3-phenyl-1,1-dimethylurea; 3-(4-chlorophenyl)-1,1-dimethylurea; 3-(3,4-dichlorophenyl)-1,1-dimethylurea; 1,1'-(4-methyl-m-phenylene)bis(3,3'-dimethylurea); 3-isomethyldimethylurea-3,5,5-trimethylcyclohexyldimethylurea; or 4,4'-methylenebis(phenyldimethylurea) The more preferred urea is 3-phenyl-1,1-dimethylurea (PDMU).

Preferred imidazoles include alkyl- or arylimidazoles, such as 2-methylimidazole, 2-undecylimidazole, 2-heptadecylimidazole, 2-phenylimidazole, 2-ethylimidazole, 2-isopropylimidazole, and 2-phenyl-4-methylimidazole; 1-cyanoethyl derivatives, such as 1-cyanoethyl-2-methylimidazole, 1-cyanoethyl-2-phenylimidazole, 1-cyanoethyl-2-undecylimidazole, and 1-cyanoethyl-2-isopropylimidazole; and carboxylic salts, such as 1-cyanoethyl-2-ethyl-4-methylimidazole-trimellitate. The more preferred imidazole is 2-methylimidazole.

The hardening accelerators may also be a urea-imidazole conjugate such as 2-methyl-N-phenyl-1H-imidazole-1-carboxamide, which can be prepared by the reaction of imidazoles with organic isocyanates.

As stated above, the heterogeneous slurry is formed at an elevated temperature. For the purposes of this specification, an elevated temperature is a temperature sufficiently above room temperature to melt the coating material, more preferably to melt the coating material and the active material, but sufficiently low to prevent thermal decomposition or volatilization of either the coating material or the active material.

The concentration of active material is preferably from about 1 weight percent, more preferably from about 10 weight percent, most preferably from about 25 weight percent, to preferably about 60 weight percent, more preferably to about 45 weight percent, and most preferably to about 35 weight percent, based on the total weight of active material and coating material.

The second step of the method of the present invention requires forming droplets. Though droplets of any size can be employed, the invention is particularly useful for microspheres of active material interspersed with the coating material. For the purposes of this invention, microspheres are spherical particles having a diameter of 500 microns or smaller. Preferred particle sizes will vary depending on the application but are preferably from about 300, more preferably from about 200 microns, and most preferably from about 150 microns in diameter; to about 10, more preferably 30, and most preferably 50 microns in diameter. Similarly, the terms "microencapsulate" and "microencapsulation" are used to describe the enclosure of active material by coating material into microspheres.

As noted in the Background of the Invention section, forming microspheres of active material interspersed with coating material can be accomplished in a variety of ways. In a preferred method of forming microspheres of active material interspersed with coating material, the heterogeneous slurry from the first step is poured at elevated temperatures sufficient to melt the coating material, more preferably at temperatures sufficient to melt the coating material and the active material, onto a rotating disk. The rotation causes the coated material/active material interspersion to be thrown off the disk as microspheres, which solidify by the cooling effect of air (the third step). The velocity of the rotating disk, the temperature of the disk, the rate at which the slurry is poured onto the disk, and the type of apparatus used determines the size of the microspheres formed.

In the fourth step, the solidified droplets, preferably the solidified microspheres of coating material interspersed with active material, are collected and contacted with a solvent that dissolves the active material, but does not dissolve the coating material.

Preferably, the solvent is polar, since the preferred coating materials are non-polar polymer waxes, and the preferred active materials are comparatively polar. More preferably, the solvent is volatile, that is to say, is easily removed by evaporation. Most preferably, the solvent has a boiling point of less than 100° C.

Examples of preferred solvents include water, alcohols, such as methanol, ethanol, and isopropanol; ketones, such as acetone and methylethyl ketone; chlorinated hydrocarbons, such as methylene chloride; and polar aprotic solvents such as acetonitrile. More preferred solvents are water, methanol, ethanol, isopropanol, and acetone. Most preferred solvents are acetone and methanol.

The amount of active material encapsulated in the coating material after solvent washing can be determined, for example, by thermogravimetric analysis (TGA), provided the active material and coating material volatilize at different temperatures. In the TGA method, a sample is placed in a platinum pan attached to a microbalance, then heated to volatilize the active material and the coating material. Since the active material and the coating material volatilize at different temperatures, the composition can be readily determined by measuring weight loss as a function of temperature.

The method of the present invention provides droplets of active material encapsulated in a coating material, preferably microspheres of active material encapsulated in a coating material, which exhibit long-term stability in adhesive formulations, yet which also exhibit high reactivity ("cure-on-demand") under moderate thermal conditions. In a preferred application, ureas or imidazoles microencapsulated in polyethylene based waxes can be stored at 40° C. or lower for months in a composition containing an epoxy resin and a dicyandiamide. When the composition is heated to a sufficiently high temperature to melt the wax, the hardening accelerator is released, thereby promoting the reaction between the epoxy resin and the dicyandiamide. (See for example Japanese Public Patent disclosure Bulletin No. 2-2923324, Dec. 3, 1990.)

EXAMPLE 1

Preparation of Solvent-Rinsed Microencapsulated Beads of PDMU Coated with a Low Molecular Weight Polyethylene Wax 3-Phenyl-1,1-dimethylurea (PDMU) (300 g) is dispersed in molten 75/25 Polywax™ 1000/Polywax™ 2000 (a 75:25 weight percent mixture of Polywax™ 1000 and Polywax™ 2000) (700 g) The mixture is then heated until the PDMU is molten, then poured at the rate of 500 g per minute onto the center of a disk maintained at 140° C. and rotating at 6500 rpm. Microspheres of PDMU interspersed with the Polywax™ are flung off the rotating disk and into a collection cone. The resultant solid microspheres (1000 g), which have a diameter in the range of 50 to 300 microns, are soaked in acetone (1000 mL) for 5 minutes, then rinsed 4 additional times with acetone (500 mL each time) to remove PDMU from the surface of the Polywax™. The beads are air-dried, then stored until they need to be used to formulate the adhesive.

EXAMPLE 2

Stability Comparison of Solvent-Washed Microspheres vs. Unwashed Microspheres

The solvent-washed microspheres from Example 1 are blended into D.E.R.™ 331 (Trademark of The Dow Chemical Company) liquid epoxy resin at 2 parts active material (PDMU) per 100 parts epoxy resin and stored at 110° F. The formulation remains fluid for six months. By comparison, a formulation containing non-encapsulated PDMU gels within 10 days.

EXAMPLE 3

An Adhesive Formulation Prepared Using Solvent-Washed Microspheres

An adhesive formulation is prepared as follows: Tactics™ 123 liquid epoxy resin (247.5 g); D.E.R.™ 755 liquid epoxy resin (247.5 g); an acrylic rubber-modified epoxy resin (495 g); aluminum powder (310 g, Reynolds A-200), Cab-O-Sil™ M-5 fumed silica (50 g); Byk™ R-605 polycarboxylic acid amide (15 g); dicyandiamide (50 g), and the solvent-washed microspheres prepared as in Example 1 (70 g) are blended in a heavy duty mixer to form a paste adhesive. The adhesive is applied to 32-mil thick, cold-rolled steel test coupons with a 5-mil bond thickness, and cured for 30 minutes at 177° C. The adhesive is found to exhibit greater than 2000 psi tensile lap shear strength and greater than 20 pounds per linear inch T-peel strength.

(Note: Tactics is a Trademark of the Dow Chemical Company; Cab-O-Sil is a Trademark of Cabot Corporation; Byk is a Trademark of Byk Chemie.)

What is claimed is:

1. A method of encapsulating an active material in a coating material immiscible therewith, the coating material having a melting point above ambient temperature, the method comprising the steps of:

a) dispersing the active material in the coating material at a temperature sufficient to melt the coating material;

b) forming droplets of active material interspersed with the coating material;

c) cooling the droplets to solidify the coating material; and d) contacting the droplets with a solvent that dissolves the active material but does not dissolve the coating material, so as to remove active material from the surface of the coating material.

2. The method of claim 1 wherein in step a) the active material is dispersed in the coating material at a temperature sufficient to melt the active material, and in steps b), c), and d), the droplets are microspheres.

3. The method of claim 2 wherein the coating material is selected from the group consisting of petroleum-derived alkane hydrocarbon waxes, polyethylene waxes, polyethylene-alkene copolymer waxes, oxidized hydrocarbon waxes containing hydroxyl or carboxyl groups, polyesters, and polyamides.

4. The method of claim 3 wherein the active material is a hardening accelerator having a melting point in the range of about 70° C. to about 200° C.

5. The method of claim 4 wherein the solvent is selected from the group consisting of water and alcohols and ketones having a boiling point of less than about 100° C.

6. The method of claim 5 wherein the hardening accelerator is a urea.

7. The method of claim 6 wherein the urea is selected from the group consisting of 3-phenyl-1,1-dimethylurea; 3-(4-chlorophenyl)-1,1-dimethylurea; 3-(3,4-dichlorophenyl)-1,1-dimethylurea; 1,1'-(4-methyl-m-phenylene)bis(3,3'-dimethylurea); 3-isomethyldimethylurea-3,5,5-trimethylcyclohexyldimethylurea; 4,4'-methylenebis(phenyldimethylurea); and 2-methyl-N-phenyl-1H-imidazole-1-carboxamide.

8. The method of claim 7 wherein the hardening accelerator is 3-phenyl-1,1-dimethylurea.

9. The method of claim 8 wherein the coating material is a polyethylene wax having a molecular weight in the range of about 1000 to about 2000 Daltons.

10. The method of claim 5 wherein the active material is an imidazole.

11. The method of claim 10 wherein the imidazole is 2-methylimidazole.

12. The method of claim 11 wherein the coating material is a polyethylene wax having a molecular weight in the range of about 1000 to about 2000 Daltons.

13. The method of claim 12 wherein the solvent is selected from the group consisting of water, acetone, methanol, ethanol, and isopropanol.

14. The method of claim 13 wherein the solvent is acetone.

15. The method of claim 9 wherein the solvent is selected from the group consisting of acetone, methanol, ethanol, and isopropanol.

16. The method of claim 15 wherein the solvent is acetone.

* * * * *

UNITED STATES PATENT AND TRADEMARK OFFICE
CERTIFICATE OF CORRECTION

PATENT NO. : 5,601,761
DATED : Feb. 11, 1997
INVENTOR(S) : Dwight K. Hoffman, David V. Dellar, Herman W. Schlameus It is certified that error appears in the above-indentified patent and that said Letters Patent is hereby corrected as shown below:

On the cover page, the Assignee should read --The Dow Chemical Company, Midland, Mich.; Southwest Research Institute, San Antonio, Tex.--

Signed and Sealed this

Seventeenth Day of February, 1998

Attest:

BRUCE LEHMAN

Attesting Officer     Commissioner of Patents and Trademarks